United States Patent [19]

Mielke

[11] Patent Number: 5,758,217
[45] Date of Patent: May 26, 1998

[54] DRIVE DEVICE FOR PIVOTING A MIRROR ON A SINGLE-LENS REFLEX CAMERA

[75] Inventor: Bodo Mielke, Wolfenbüttel, Germany

[73] Assignee: Rollei Fototechnic GMBA, Brunswick, Germany

[21] Appl. No.: 579,779

[22] Filed: Dec. 28, 1995

[30] Foreign Application Priority Data

Dec. 29, 1994 [DE] Germany ............ 44 47 092.4

[51] Int. Cl.⁶ ........................................... G03B 19/12
[52] U.S. Cl. .................................. 396/358; 396/56
[58] Field of Search .......................... 354/152, 156; 396/354, 358, 56, 59

[56] References Cited

U.S. PATENT DOCUMENTS

| | | | |
|---|---|---|---|
| 3,842,587 | 10/1974 | Strauss et al. | 354/30 |
| 3,852,791 | 12/1974 | Eukuda | 354/152 |
| 3,891,992 | 6/1975 | Ueda et al. | 354/152 |
| 3,913,112 | 10/1975 | Takahama | 354/156 |
| 4,327,982 | 5/1982 | Yamamichi et al. | 354/156 |
| 4,338,009 | 7/1982 | Lee | 354/152 |
| 4,502,769 | 3/1985 | Nakamori et al. | 354/152 |
| 4,512,647 | 4/1985 | Yamazaki | 354/441 |
| 4,786,929 | 11/1988 | Hamada et al. | 354/154 |
| 5,255,038 | 10/1993 | Suzuka | 354/266 |
| 5,508,772 | 4/1996 | Tanabe | 354/234.1 |

OTHER PUBLICATIONS

"What format?" the British Journal of Photography, jan. 28, 1993, pp. 16, 17, and 20.

*Primary Examiner*—Safet Metjahic
*Assistant Examiner*—John Chizmar
*Attorney, Agent, or Firm*—Whitham, Curtis, Whitham & McGinn

[57] ABSTRACT

The invention relates to a drive device for pivoting a viewfinder mirror (1) in a single-lens reflex camera between its finding and its taking positions. An improvement in this drive is characterized according to the invention by a separate electrical drive (4, 5, 13), which, mechanically decoupled, can be controlled directly through an external interface (12).

12 Claims, 1 Drawing Sheet

DRIVE DEVICE FOR PIVOTING A MIRROR ON A SINGLE-LENS REFLEX CAMERA

BACKGROUND OF THE INVENTION

1 Field of the Invention

The invention relates to a drive device for pivoting the viewfinder mirror in a single-lens refex camera between its finding and its taking positions.

2 Description of the Prior Art

In known embodiments, the pivoting of the mirror is performed by an articulated drive connection composed of a plurality of levers. The actual driving is performed by a motorized gear and sector drive provided for winding the shutter.

Pretriggering of the mirror is a known requirement in photomicrography, in the macro range, and in photography using telephoto lenses.

If pretriggering of the mirror is required, in known embodiments, a manual intervention for this purpose is always required using a separate operating element. The drive separation performed thereby is then automatically canceled the subsequent camera operation. In an additionally lockable design of mirror pretriggering intended for several taking cycles, the reset, in other words the cancellation of the drive separation, is always possible only manually. This is disadvantageous, especially in electronic photography (for example using digital camera backs) in which a color image requires three successive exposures by means of an RGB filter wheel with shutter function between exposures and without the otherwise coupled mirror function for the CCD data readouts.

A disadvantage of known drive systems is the vibration of the camera caused by pretriggering of the mirror.

SUMMARY OF THE INVENTION

The goal of the invention is to provide a drive device for pivoting the mirror that eliminates the disadvantages listed above.

This goal is achieved according to the invention by a separate electrical drive which is directly controllable, while mechanically decoupled, through an intelligent outside interface.

The drive device according to the invention is preferably suited for a camera system with motorized individual drives for the shutter, diaphragm, film transport, etc. An intelligent interface to the outside (for a PC, special accessories such as use modules and the like) makes it possible to control all functions and operating states of the camera from the exterior or to read them out alternatively. According to the invention, the viewfinder mirror can now also be controlled directly through this interface. This makes it possible to reduce camera vibration caused by pretriggering of the mirror to an unavoidable minimum.

According to the invention, a dip coil drive is especially suitable as the electrical drive.

According to the invention, it is advantageous if a tilting tensioning device is provided to create stable end positions for the viewfinder mirror, with the wire spring of said tilting tensioning device pressing, by virtue of its predetermined pretensioning, the view finder mirror against a fixed stop that defines its end position. It is advantageous in this regard for the mirror stop to be adjustable.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
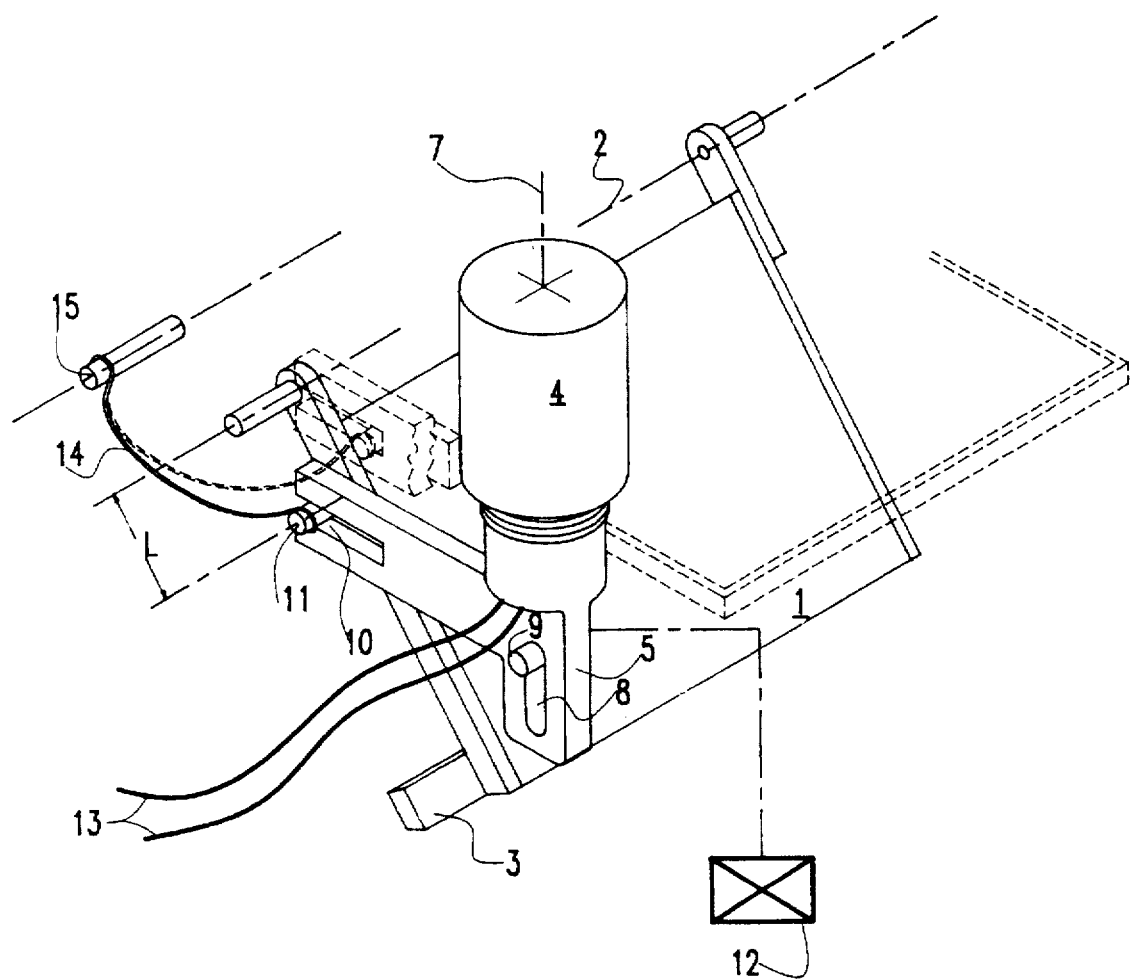
FIG. 1 is an isometric schematic view of a viewfinder mirror in a single-lens reflex camera pivoting between its viewfinding and taking positions.

A simple and reliable force transmission can be provided according to the invention by virtue of the fact that a slot guide is provided on the coil body of the dip coil drive, into which a guide pin projects that is mounted axially parallel to and with a lever distance from the pivot axis of the viewfinder mirror, on the latter. This facilitates assembly if the slot guide is formed by a fork.

A design that is simple in construction and composed of a few parts is accomplished according to the invention by virtue of the fact that the wire spring that forms the tilting tensioning device has one end engaging a fixed counterbearing and its other end abutting a pin mounted on the viewfinder mirror.

For exact drive guidance, it is advantageous for a straight guide to be provided on the coil body which preferably consists of a slot running parallel to the coil axis, into which slot a fixed pin projects.

To reduce the number of parts to be assembled, provision is made according to the invention such that the slot guide and the slot of the straight guide are both formed by a gate molded on the coil body.

The drive device according to the invention also permits remote operation. Because of the small number of components, assembly is considerably simplified and shortened, reliability of the drive device is improved, and manufacturing costs are reduced.

The drawing shows an embodiment of the invention in schematic form intended as an example.

In the camera body of a single-lens reflex camera, not shown in greater detail, a viewfinder mirror 1 is mounted which is pivotable around a pivot axis 2 between its finder position (solid lines) and its taking position (dashed lines). In both of its end positions the finder mirror abuts an adjustable mirror stop 3 which is otherwise mounted in a fixed position in the camera body.

To pivot viewfinder mirror 1, an electrical drive is provided that is in the form of a dip coil drive whose magnetic head 4 is fastened in a fixed position inside the camera body. An angular gate 6 is molded on coil body 5 of the dip coil drive. One leg of this gate 6 forms a straight guide for the coil body 5, which has a slot 8 provided in coil axis 7 into which a fixed pin 9 fits. The other gate leg is made fork-shaped at its free end, thus forming a slot guide 10 which runs approximately at right angles to slot 8 of the straight guide and fits over a pin 11 that is fastened axially parallel to, and with a lever distance 1 from, pivot axis 2 of viewfinder mirror 1.

The electrical drive is controlled by an intelligent external interface 12 provided on the camera body. The power supply is provided by an electrical coil connection 13 that is likewise only indicated schematically.

To form stable end positions for the viewfinder mirror, a tilting tensioning device is provided, formed by a pretensioned wire spring 14 that has one end abutting a fixed counterbearing 15 and has its other end abutting pin 11 mounted on viewfinder mirror.

I claim:

1. Drive device for pivoting a viewfinder mirror in a single-lens reflex camera between its finding and taking positions, said single-lens reflex camera having a motorized individual drive for a shutter, said drive device for pivoting the viewfinder mirror comprising:

an electrical dip coil drive mechanically connected to said viewfinder mirror and independent of the motorized individual drive for the shutter; and an external interface connected to said electrical dip coil drive which allows separate control of said electrical dip coil drive.

2. Drive device according to claim 1 further comprising a slot guide provided on a coil body of said electrical dip coil drive and a pin which fits into said slot guide, said pin being fastened axially parallel to, and with a lever distance from, a pivot axis of said viewfinder mirror;

3. Drive device according to claim 2 wherein said slot guide is formed in the shape of a fork.

4. Drive device according to claim 2 further comprising a wire spring having a first end abutting a fixed counterbearing and a second end abutting a pin mounted on said viewfinder mirror .

5. Drive device according to claim 1 further comprising a straight guide provided on a coil body of said electrical dip coil drive.

6. Drive device according to claim 5 wherein said straight guide includes a slot running parallel to a coil axis of said electrical dip coil drive, said slot riding on a fixed pin.

7. Drive device according to claim 2 further comprising a straight guide provided on said coil body of said electrical dip coil drive including a slot which rides on a fixed pin, said straight guide and said slot guide both being formed on a gate of said coil body.

8. A drive device for pivoting a viewfinder mirror in a single-lens reflex camera between its finding and its taking positions, said single-lens reflex camera having a motorized individual drive for a shutter, said drive device for pivoting the viewfinder mirror comprising:

a dip coil drive;

an external interface electrically connected to said dip coil drive and independent of the motorized individual drive for the shutter which allows separate control of said dip coil drive; and means for mechanically connecting said dip coil drive to a view finder mirror including a gate formed on a coil body of said dip coil drive, said gate including a slot guide formed therein, and a pin positioned to slide within said slot guide in said gate, said pin being connected to said viewfinder mirror at a preselected lever distance from a pivot axis of said viewfinder mirror.

9. The drive device of claim 8 further comprising a straight guide extending from a first portion of said gate, said straight guide being in alignment with said coil body of said dip coil drive.

10. The drive device of claim 9 wherein said straight guide comprises a slot running parallel to a coil axis of said dip coil drive, and a fixed pin positioned within said slot.

11. The drive device of claim 8 wherein said slot guide has a fork shape.

12. The drive device of claim 8 further comprising:

mirror stops positioned to engage a movable end of said viewfinder mirror; and a tilting tensioning device connected to said pin.

* * * * *